Nov. 24, 1970     C. S. PHELAN     3,541,840
ROTATING PROBE ASSEMBLY
Filed Nov. 13, 1968     2 Sheets-Sheet 1
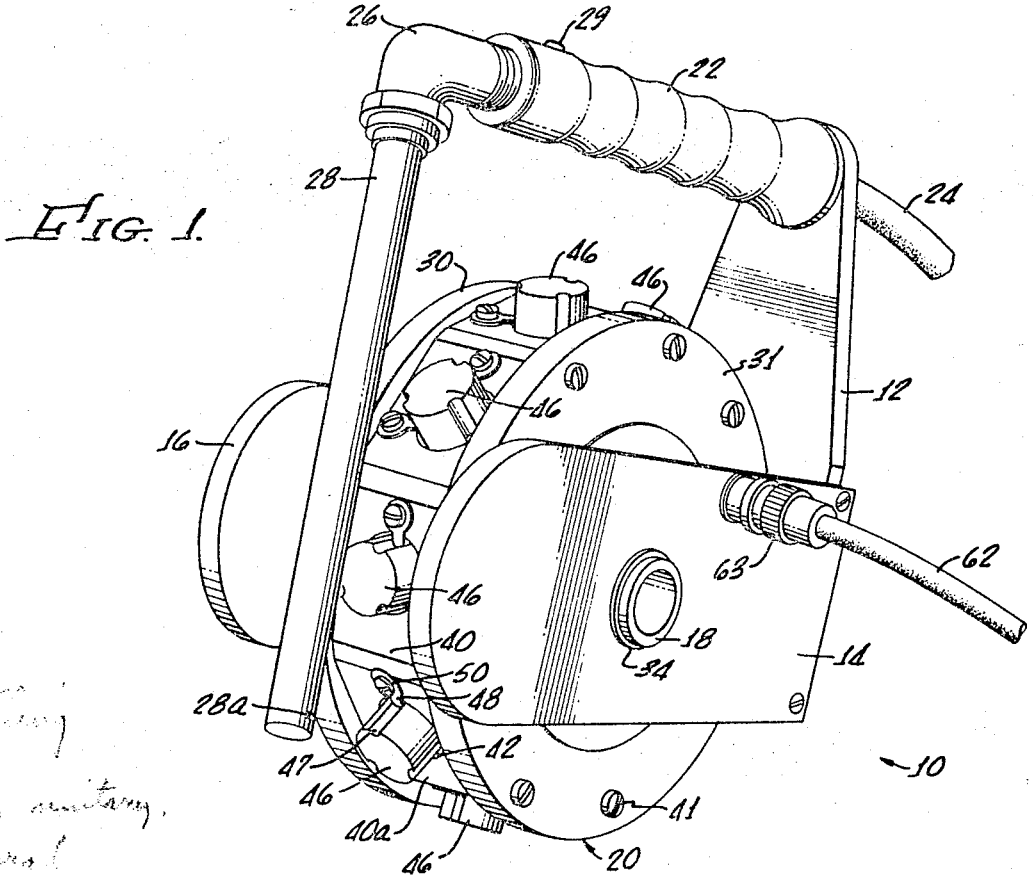
Fig. 1.
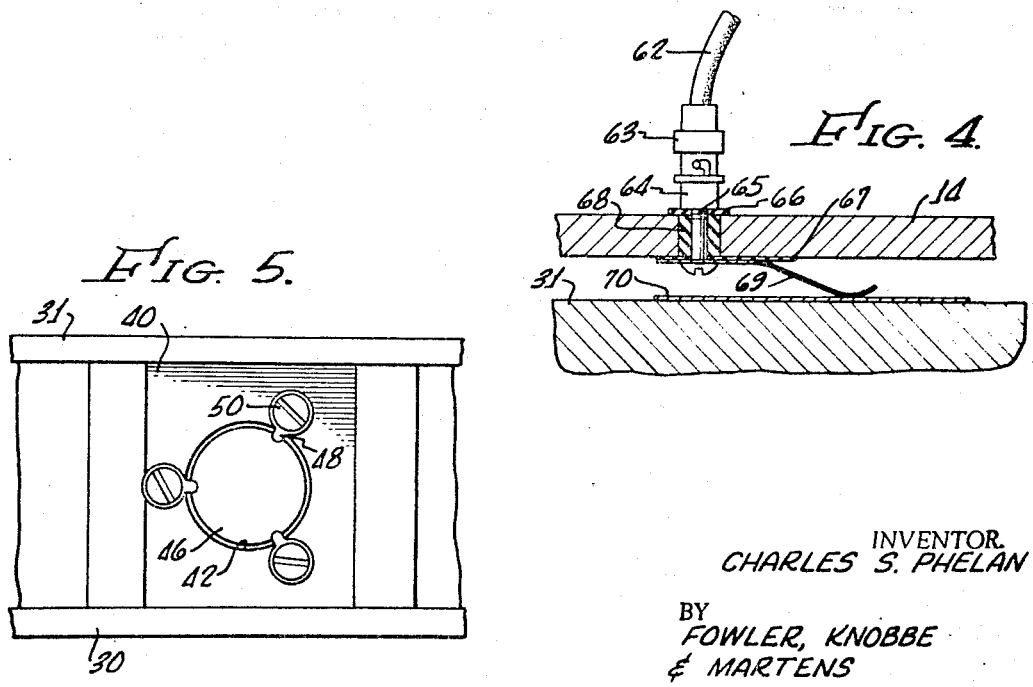
Fig. 4.
Fig. 5.
INVENTOR.
CHARLES S. PHELAN
BY
FOWLER, KNOBBE
& MARTENS
    ATTORNEYS.

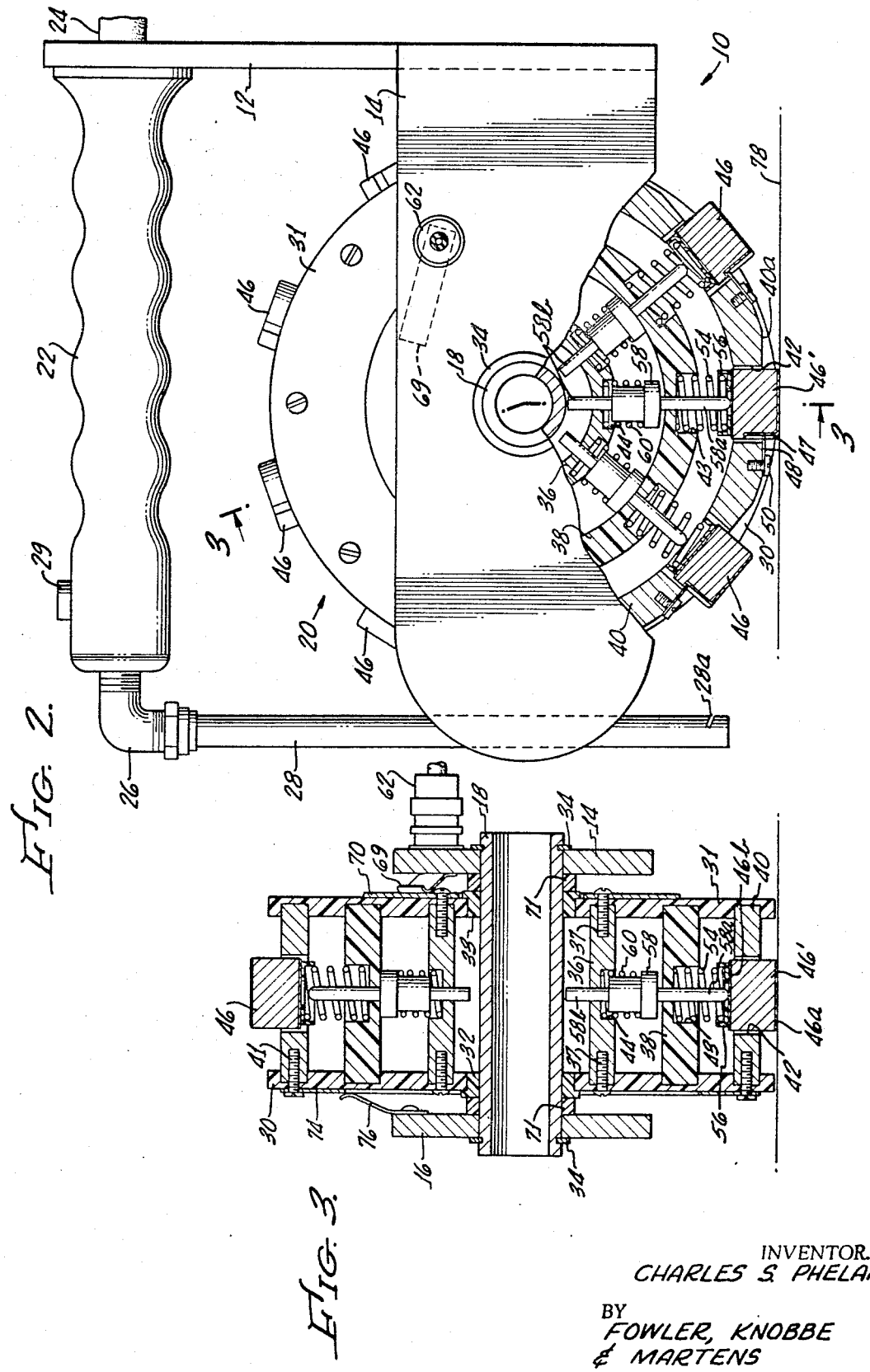

United States Patent Office 3,541,840
Patented Nov. 24, 1970

3,541,840
ROTATING PROBE ASSEMBLY
Charles S. Phelan, Tustin, Calif., assignor to Shurtronics Corporation, a corporation of California
Filed Nov. 13, 1968, Ser. No. 775,349
Int. Cl. G01n 29/04
U.S. Cl. 73—71.5
4 Claims

ABSTRACT OF THE DISCLOSURE

A wheel carrying a series of transducers mounted in its periphery is rotated along a test item, the transducers sequentially engaging the test item. The transducers are automatically ultrasonically energized when engaging the test item and de-energized when not engaging the test item with the result that a series of readings can be rapidly obtained testing the structural quality of the item.

BACKGROUND OF THE INVENTION

This invention relates to an improved rotating probe assembly for use with ultrasonic test apparatus used to evaluate the integrity of a structure, particularly the quality of bonds between layers of a bonded construction, such as aircraft fuselage panels.

In known ultrasonic bond testing apparatus, a piezoelectric crystal is mounted in a probe which is coupled to the material under test by a film of couplant fluid. When the crystal is ultrasonically energized, the structural integrity of the bonded product may be determined. An unsatisfactory bond is indicated in movement of an electrical meter or a change in an oscilloscope pattern due to changes in mechanical impedance of the structure.

As the aricraft industry has expanded, the air frame structures used have grown in size such that bonded fuselage panels are now very large, and it is desirable that the integrity of the bonds be tested at closely spaced intervals throughout the entire panel. Also, due to improvements in bonding techniques, the number of items being constructed in layers has increased tremendously. Consequently, it is very important that such testing be conducted quickly and economically as well as accurately.

Most ultrasonic testing of this nature has been performed by an operator physically moving a single probe carrying a single transducer from one location to the next on a panel to be tested. This procedure is particularly slow and also very tiring for the operator in that the operator must continually lift the probe away from the test panel, move it transversely and then move it towards the panel for the next test. With the larger diameter transducers, the force required to lift the probe from the test item is quite substantial because the coupling fluid employed together with the large flat surface of the transducer, creates considerable adhesive forces. Hand operation of this type is also subject to greater likelihood of operator error due to the difficulty of employing consistent forces when applying the probe to the test item.

Some success has been attained by employing a plurality of transducers in a movable assembly which is mechanically moved in and out from the test item and transversely with respect to the test item to a new location so that much of the operation is automated. One difficulty with such automated apparatus is that the equipment is somewhat cumbersome and hence the panels may have to be brought to the equipment for testing. Also, the initial investment is considerable with the result that its use is largely limited to the testing of large volume production of panels. Another limitation is that such automated apparatus cannot be conveniently employed on products having a relatively small surface area, such as helicopter rotor blades for example.

Accordingly, a need exists for a probe head assembly having the advantages of manual operation coupled with the speed and cost advantages of multiple probe automated apparatus.

SUMMARY OF THE INVENTION

The ultrasonic probe assembly of the invention includes a support, a wheel rotatably mounted on the support, a series of spaced transducers resiliently mounted around the periphery of the wheel with their outer faces extending beyond the periphery, and switch means for automatically energizing the transducer in contact with the test item and de-energizing the transducers not in contact with the test item. In operation, the wheel is rotated along the outer surface of an item to be tested so that the transducers sequentially engage the test item. The transducers are spaced and mounted such that a single transducer engages the test item at one time, and so that the transducers can accommodate the cocking action received as the wheel is rotated.

In a preferred form of the invention, the wheel is constructed of a pair of disks made of insulated material and mounted on a hub with three axially short cylindrical rings being concentrically mounted around the hub and clamped between the two disks. The short cylindrical transducers are positioned within holes formed in the outer ring, their outward movement being limited by guides attached to the outer ring. Coil springs extending between the middle ring and the transducers urge the transducers outwardly. A plurality of conductive pins extending between the inner and middle rings and having forward portions which extend through the middle ring provide the necessary switching function for sequential energization of the transducers. The coil springs normally urge the transducers away from the conductive pin so that they are de-energized. However, the weight of the assembly on the transducer engaging the test item overcomes the force of the spring urging the transducer away from the conductive pin so that the transducer engages the conductive pin and is energized. As the wheel is rotated further, the transducer which was energized is forced away from its conductive pin by its spring so that it becomes automatically de-energized. In this fashion, a series of test readings can be obtained. The electrical energy is brought into the conductive pins through slip rings cooperating with the structural elements of the wheel, and the circuit to the outer face of a transducer is completed through a separate sliding contact connected to ground.

It is desirable that a coupling fluid be sprayed onto the test item as the transducers engage the test item. For this purpose, fluid dispensing means are incorporated into the handle of the support carrying the wheel and fluid is dispensed onto the test item as desired by means of a manual control on the handle.

BRIEF DESCRIPTION OF THE DRAWINGS

FIG. 1 is a perspective view of the rotating probe assembly of the invention;

FIG. 2 is a side elevational view of the assembly with part of the wheel shown in cross-section and with the assembly in operation;

FIG. 3 is a cross-sectional view through the wheel taken on line 3—3 of FIG. 2;

FIG. 4 is a cross-sectional view of a portion of the assembly illustrating the slip ring means by which energy is brought into the assembly; and FIG. 5 is a partial view of the periphery of the wheel illustrating the manner in which a transducer is mounted in the wheel.

DETAILED DESCRIPTION OF A PREFERRED EMBODIMENT OF THE INVENTION

Referring to FIGS. 1 and 2, the rotating probe assembly includes a support unit comprising a back plate 12 and a pair of arms 14 and 16 extending outwardly from the back plate in spaced parallel relationship. A tubular shaft 18 is supported by the arms 14 and 16 and spaced from the back plate 12, and wheel assembly 20 is rotatably mounted on the shaft 18.

Attached to the back plate spaced from the arms 14 and 16 and extending generally parallel to the arms 14 and 16 is a handle 22, which also forms a part of a fluid dispensing means for spraying fluid onto the surface of an item to be tested. The handle is hollow and connected to a conduit 24 which in turn is connected to a pressurized fluid source (not shown). The forward end of the handle has connected thereto a 90° elbow 26 which in turn is connected to a rigid tube 28 which extends generally parallel to the back plate 12 towards the side of the wheel to be engaged with the test item. A slot 28a in the downstream end of the tube 28 forms a nozzle through which the fluid is sprayed. A manual control button 29 on the handle 22 is provided to control the spray of fluid from the nozzle.

Referring now to FIG. 3 as well as to FIGS. 1 and 2, may be seen that the wheel assembly 20 includes a pair of spaced disks 30 and 31 attached to bearings 32 and 33 which rotate on the tubular shaft 18. The shaft is held in position in the support arms 14 and 16 by means of retaining rings 34 which may be seen in FIG. 3. The wheel disks 20 and 31 are preferably made of an insulating material that will be subsequently explained in greater detail. The inner surfaces of the disks 30 and 31 are formed with three concentrically spaced annular grooves which receive the axial ends of three concentrically spaced, short cylindrical rings 36, 38 and 40. The rings are clamped between the disks 30 and 31 by a plurality of threaded fasteners 37, which thread into the inner ring 36 and a plurality of fasteners 41 threaded into the outer ring 40. The middle ring 38 is simply held in position by the disks and the other rings and fasteners. In the arrangement illustrated, the inner ring 36 and the outer ring 40 are preferably made of an electrically conductive material such as aluminum which is also relatively strong and light weight. The middle ring 38 may be made of similar material, although it need not be electrically conductive material such as aluminum which is also relatively strong and light weight. The middle ring 38 may be made of similar material, although it need not be electrically conductive.

The outer ring 40 is formed with a series of holes 42 which extend radially completely through the rings and which are circumferentially spaced about the periphery of the ring and are centered between the disks 30 and 31. The middle ring 38 is formed with a series of sockets 43 in its outer surface and the inner ring 36 is formed with a similar series of sockets 44 in its outer surface. The sockets 43 and 44 are radially aligned with the holes 42 in the outer ring 40.

Within each hole 42 in the outer ring 40, there is positioned a short cylindrical piezo-electric crystal 46 which serves as a transducer for translating electrical energy into mechanical energy. The crystals can be made of a variety of materials, one suitable substance being barium titanate ceramic (BaTiO₃). Referring to FIGS. 1 and 5, it may be seen that each transducer 46 is formed with three axially extending grooves 47 in its outer cylindrical surface that extends from the outer axial face of the transducer and terminates spaced from the inner axial surface. Three rigid, metal finger like guides 48 attached to the outer ring 40 by screws 50 and spaced around each of the transducers extend into the axial grooves 47 and loosely guide the transducer while limiting its outer movement. Note from FIGS. 1, 2 and 5 that the area 40a of the outer surface of the ring 40 surrounding each of the holes 42 is flat so as to facilitate mounting of the transducers.

The outer axial face of each transducer is covered with an electrically conductive coating 46a (FIG. 3) which also extends into the grooves 47 so that the outer face of the transducer is electrically connected through the metal guides 48 to the outer ring 40. The inner axial face of each transducer is similarly formed with an electrically conductive coating 46b.

The transducers 46 are urged radially outwardly by a plurality of coil springs 54 extending between the middle ring 38 and the outer ring 40 with one end of each spring 54 being positioned in a socket 43 in the middle ring, and the other end of each spring engaging an insulated washer 56 which in turn engages the inner axial face of the transducer.

Positioned between the middle ring 38 and the inner ring 36, are the enlarged central portions of a series of conductive pins 58. The forward portion 58a of each pin extends through an aperture in the socket 43 in the middle ring and terminates adjacent the rear of the transducer 46. The rear portion 58b of each conductive pin extends through an aperture formed in the inner ring 36 aligned with each socket 44 so that the forward and rear extensions of the conductive pin effectively position the conductive pin in a circumferential direction while permitting radial movement of the pin. A coil spring 60 surrounds a portion of each conductive pin and has one end engaging the rear of the enlarged central portion of each conductive pin while the other end of the spring 60 is received within one of the sockets 44 in the inner ring 36. Accordingly, the springs 60 urge the conductive pin radially outwardly, while permitting limited inward movement of the pin when necessary.

Power for energizing the transducers is provided by means of a cable 62 attached by a bayonnet coupling (FIG. 4) to a suitable connection 64 which is attached to support arm 14 by means of a conductive screw 65 which extends through the support arm. Insulated washers 66 and 67 and an insulated bushing 68 insulate the connection 64 and the screw 65 from the support arm 14. A flexible conductive contact arm 69 is clamped between the head on the screw 65, and the insulated washer 67 on the inner side of the arm 14. The contact arm 69 in turn forms a sliding contact for a slip ring 70 which is attached to the outer surface of the insulated disk 31 by means of the fasteners 37 which extend through the disk 31 and thread into the inner ring 36. As seen in FIG. 3, a pair of spacers 71 maintain a desired space between the wheel disk 30 and 31 and the support arms 14 and 16, the arm 69 fitting in one of the spaces. Since the fasteners 37 are electrically conductive, electrical energy from the power cord is conducted to the ring 36. The coil springs 44 which are in contact with the inner conductive rings 36 in turn engage the conductive pin 58 so that with this arrangement, the conductive pins are energized at all times.

As previously mentioned, the outer conductive surface of the transducers 46 are electrically connected by the guides 48 and the screws 50 to the outer ring 40. The outer ring 40 is in turn electrically connected by the threaded fasteners 41 to a large slip ring 74 clamped between the heads of the fasteners and the outer surface of the insulated disk 30. A flexible contact arm 76 mounted on the support arm 16 engages the outer slip ring 74. Thus, the outer surface of the transducer 46' is grounded to the support arm 10.

OPERATION

The probe assembly is shown in operation in FIG. 2 with the bottom transducer 46 shown engaging the surface 78 which is to represent the surface of an item to be tested, such as a bonded fuselage panel of an aircraft or a laminated helicopter blade. With the outer face of the transducer 46' engaging the test item 78, the weight of the probe assembly causes the assembly to move downwardly against the resisting force of the spring 54 to the position shown in FIG. 2. Note that the transducer 46' is in effect withdrawn further into its hole in the outer ring 40 against the urging of the outer coil spring 54 wherein the outer tip 58a of the conductive pin 58 engages the rear conductive coating 46b on the transducer 46'. The inner coil spring 60 also permits the conductive pin as well as the transducer to be moved radially inwardly so that the transducer is in effect resiliently engaged against the surface of the test item. The spring strengths are selected to prevent damage to the transducers. The operator would, of course, be holding the probe assembly by the handle 22 so that the entire weight of the assembly need not be on the transducer; however, the weight limitations are not critical and one of the advantages of the system is that it is easy for the operator to hold and move the unit.

With the transducer 46' illustrated in FIG. 2, the electrical circuit is completed when the conductive pin engages the transduced in that as previously explained, the conductive pin is constantly energized through the coil spring 60, inner ring 36, screws 37, slip ring 70 and power cable 62. Accordingly, as soon as this situation occurs, a "reading" of the quality of the adhesive bond between layers of the test panel 78 can be made. An indication of the quality is measured by the voltage drop across the transducer and by comparing it with the known expected drop for a good quality bond.

The principle of operation for ultrasonic testing is a known phenomenon and hence is not described in any detail in this publication. Ultrasonic bond testing equipment employing transducers of the type described herein and control equipment for energizing transducers and reading the output to determine the quality of a bond is presently sold by the assignee of this invention. Thus, reference may be had to this organization for details of structure or operation regarding such known equipment.

Such equipment may include signalling apparatus to indicate whether a bond is satisfactory or not. Thus, if an unacceptable bond is indicated, the operator can mark the area for further inspection or repair. If desired, a permanent record of all readings may be provided by suitable printout equipment (not shown). Assuming the reading is satisfactory, the operator will continue to move the assembly across the surface of the test item and the next transducer is brought into engagement with the test item. From FIG. 2 it can be seen that the transducers adjacent the transducer 46' in contact with the test item, are spaced from their conductive pins 58 by the coil springs 54. Through this automatic switching, the electrical circuit energizing the transducer 46' is interrupted as soon as the transducer is no longer pressed against the test item. Or stated in other words, only the transducer in contact with the test item is energized, and hence one accurate single reading is obtained at one time. Hence, the same control equipment used in connection with a probe carrying a single transduced can be employed with this system. As soon as the next transducer is rolled into engagement with the test item, an additional test reading is automatically obtained.

One of the advantages of this rotating probe assembly is that only a very short time interval is required to take a reading on a given transducer. Hence, the assembly can be rotated across the surface of a test item at a fairly uniform and rapid rate. It has been found that the apparatus can easily take successive readings when the assembly is moved at a speed across the test item which the operator can comfortably maintain for an extended time period. So long as satisfactory readings are obtained, this operation continues in a smooth manner so that a single operator with a single probe assembly can test large areas relatively quickly and with considerable ease and accuracy.

With ultrasonic test equipment of this type, it is desirable that a coupling fluid be dispensed between the outer face of the transduced in the test item so that a good mechanical connection is obtained between the two surfaces. As mentioned above, such a fluid is connected to the assembly through the conduit 24. Thus, as the assembly is rotated, the operator can spray a stream of such fluid through the nozzle 28a onto the test item by means of the control button 29.

The presence of this fluid creates an adhesive force between the outer flat surface of the transducer and the test item. This force is quite considerable when large cross-section transducers are employed. One of the advantages of the rotating probe head assembly is that the transducers are essentially rocked off the surface of the test item. That is, one edge of the transducer is normally raised before the opposite edge is raised. Raising the transducer in this fashion requires much less force than is required to lift the transducer perpendicularly from the test item, as is the usual tendency for an operator when utilizing a single probe transducer unit.

I claim:
1. An ultrasonic probe assembly comprising:
   a support;
   a wheel rotatably mounted on the support;
   a series of spaced transducers mounted around the periphery of the wheel with their outer faces extending beyond the periphery so that the wheel may be rotated adjacent a surface to be tested with the transducers sequentially engaging the test item;
   switch means for energizing the transducers when in contact with the test item and de-energizing the transducers when not in contact with the test item;
   said wheel includes a pair of spaced disks mounted on a central hub and three axially short cylindrical rings concentrically spaced around the hub and clamped between the disks, the outer ring being located adjacent the outer periphery of the disk and having a plurality of circumferentially spaced, radially oriented holes, with a transducer being positioned in each of the holes;
   guide means attached to the outer ring limiting the outward movement of the transducers; and
   an outer series of coil springs extending between the outer ring and the middle ring, each ring being aligned with one of the holes and positioned to urge one of the transducers outwardly, thus permitting the transducers to move radially inwardly and outwardly as the wheel is rotated, and said means for energizing the transducers includes means utilizing the radial inward and outward movement of the transducers to energize the transducer;
   said switch means further including a plurality of conductive pins, each extending between the inner and middle rings and each including a forward portion which extends through the middle ring and is normally spaced from the rear surface of a transducer and each including a rear portion which extends through the inner ring for guide purposes, an inner series of springs extending between the inner and middle rings and each surrounding a conductive pin and urging the pin radially outwardly towards a transducer while permitting inward movement of the pin, and conductive means extending through one of said disks energizing the conductive pins so that when a given transducer engages the test item and thus is forced inwardly by the weight of the assembly, the transducer engages the forward portion of its conductive pin causing the transducer to become energized.

2. The assembly of claim 1:
   wherein said inner ring and said inner springs are made of electrically conductive metal and said pins are in contact with the inner springs; and
   said disks are made of insulated material; and
   including a conductive slip ring attached to one of the disks by a plurality of metallic fasteners which extend through the disk and are threaded into the inner ring;
a power connection attached to said support; and
a flexible contact connected to the power connection slideably engaging the slip ring whereby power is transmitted to the inner ring, the inner springs, and the conductive pins.

3. The assembly of claim 2:
wherein said outer ring and the transducer guide means are electrically conductive, and the guide means are connected to a conductive coating on the outer face of the transducer; and
including an outer slip ring mounted on the outer face of one of said disks by a plurality of conductive fasteners which extend through the disk and into the outer ring; and
a flexible contact mounted on said support engaging said outer slip ring to electrically ground the outer face of the transducer.

4. An ultrasonic probe assembly comprising:
support means including a back plate and a pair of arms attached to the back plate and extending outwardly therefrom in spaced parallel relationship, and a handle attached to the back plate extending generally parallel to the arms;
a shaft extending between and supported by said arms with a wheel rotatably mounted on the shaft, the wheel including a pair of spaced disks with the periphery of the disks extending beyond the edge of the arms on the side of the arms remote from the handle, and two axially short cylindrical rings concentrically spaced around said shaft and clamped between said disks, the diameter of the larger ring being considerably less than the diameter of the disks, said rings being formed with a series of circumferentially spaced, radially oriented apertures with the apertures in one ring radially aligned with those of the other, each ring being further formed with a socket in its outer surface around each of the apertures, and transducer positioning means located near the periphery of the disks and having a series of radially oriented holes respectively radially aligned with one of said sockets;
a series of generally cylindrical transducers each positioned within a respective one of said holes;
a plurality of guides spaced around said holes supported by said transducer positioning means and extending into said holes to cooperate with said transducers in a manner to limit the outward movement of and to limit the sideways movement of the transducers;
a plurality of outer coil springs each radially aligned with a respective one of said transducers with one end of each spring positioned in one of said sockets in the outer ring and the other end of each spring reacting against the radially inner face of one of the transducers to urge the transducer radially outwardly;
a plurality of conductive pins each having an enlarged central portion positioned between said rings, an outer portion extending through a respective one of said apertures in said larger ring and a rearward portion extending through a respective one of the apertures in the inner ring;
a plurality of inner coil springs, each surrounding a portion of one of said conductive pins with one end of each spring positioned within one of said sockets in the inner ring and the other end of the spring engaging the enlarged central portion of the pin to urge the pin radially outwardly, said conductive pin and said springs being arranged with respect to said transducers in a manner such that a transducer is normally spaced from the outer tip of a conductive pin when the transducer is not depressed, but when the transducer is pressed against a test surface, it moves inwardly so that its inner surface engages the forward tip of the conductive pin;
slip ring means formed on one of said support arms and one of said disks for conducting electrical energy to said conductive pins whereby each of said transducers is sequentially energized as the wheel is rotated along the surface of a test item with the transducers sequentially engaging the test item;
sliding means for electrically connecting the outer surface of said transducers to a ground on the support means; and
fluid dispensing means for spraying fluid onto the surface of the test item to be engaged by the transducers including a conduit extending through said handle and a tube attached to the end of the handle remote from said back plate, the tube extending generally parallel to the back plate towards the side of the wheel to be engaged with the test item, a nozzle formed in the end of the tube oriented to direct fluid from the tube onto the test item in the area to be engaged by a transducer, and manual means for dispensing fluid from the nozzle as desired.

References Cited
UNITED STATES PATENTS

| | | | |
|---|---|---|---|
| 2,834,202 | 5/1958 | Cook | 73—81 |
| 2,834,203 | 5/1958 | Sampson | 73—81 |
| 3,368,674 | 2/1968 | Koeppe | 73—81 |
| 3,019,637 | 2/1962 | Cook et al. | 73—67.7 |
| 3,401,547 | 9/1968 | Hall et al. | 73—67.5 |
| 3,423,993 | 1/1969 | Lynnworth | 73—71.5 |

RICHARD C. QUEISSER, Primary Examiner

C. E. SNEE III, Assistant Examiner